(12) United States Patent
Ohkawa et al.

(10) Patent No.: US 6,279,893 B1
(45) Date of Patent: Aug. 28, 2001

(54) AUTOMATIC SHEET FEEDER FOR AN IMAGE FORMING APPARATUS

(75) Inventors: Kenichi Ohkawa; Kohshi Takano; Keisuke Hatomi, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/436,004

(22) Filed: Nov. 9, 1999

(30) Foreign Application Priority Data

Nov. 13, 1998 (JP) .................................................. 10-322726

(51) Int. Cl.[7] ........................................................ B65H 5/00
(52) U.S. Cl. ................................... 271/10.12; 271/10.11; 271/116; 271/171; 271/122; 271/167; 271/270
(58) Field of Search ........................... 271/171, 10.11, 271/10.12, 10.13, 245, 246, 167, 114, 116, 270, 122

(56) References Cited

U.S. PATENT DOCUMENTS

| | | | | |
|---|---|---|---|---|
| 4,113,244 | * | 9/1978 | Ruenzi | 271/270 |
| 4,268,021 | * | 5/1981 | Rutishauser et al. | 271/116 |
| 4,523,832 | * | 6/1985 | Strutt et al. | 271/10.11 |
| 5,052,676 | * | 10/1991 | Shina et al. | 271/167 |
| 5,648,808 | * | 7/1997 | Yanagi et al. | 271/116 |
| 5,755,435 | * | 5/1998 | Fujiwara | 271/10.13 |
| 5,971,390 | * | 10/1999 | Caspar et al. | 271/171 |
| 5,975,517 | * | 11/1999 | Lim | 271/171 |
| 6,059,279 | * | 5/2000 | Wenthe | 271/10.11 |

FOREIGN PATENT DOCUMENTS

| | | |
|---|---|---|
| 2359081 | 6/1974 | (DE) . |
| 2816430 | 10/1978 | (DE) . |
| 56-24750 | 7/1954 | (JP) . |
| 58-188238 | 11/1983 | (JP) . |
| 62-211254 | 9/1987 | (JP) . |
| 63-60829 | 3/1988 | (JP) . |
| 4-277150 | 10/1992 | (JP) . |
| 6-329303 | 11/1994 | (JP) . |
| 7-41191 | 2/1995 | (JP) . |
| 7-61616 | 3/1995 | (JP) . |
| 2636085 | 4/1997 | (JP) . |
| 9-216772 | 8/1997 | (JP) . |
| 10-120213 | 5/1998 | (JP) . |
| 11-35174 | 2/1999 | (JP) . |

OTHER PUBLICATIONS

Japanese Office Action issued Nov. 30, 1999 in a related application and English translation of relevant portions.
Japanese Office Action issued Mar. 28, 1999 in a related application and English translation of relevant portions.

* cited by examiner

Primary Examiner—H. Grant Skaggs
(74) Attorney, Agent, or Firm—Ostrolenk, Faber, Gerb & Soffen, LLP

(57) ABSTRACT

An automatic sheet feeder for an image forming apparatus includes a tray to be loaded with a stack of sheets, a side guide for preventing the sheets from skewing, and a sheet feeding mechanism for sequentially picking up and feeding the sheets, the top sheet being first. The tray includes an abutment parallel to a direction of sheet conveyance. The stack of sheets abut against the abutment at one side thereof. The side guide is movable toward and away from the abutment in matching relation to the size of the sheets. The sheet feeding mechanism is positioned at the intermediate between the abutment and the position of the side guide matching with sheets of minimum size available with the sheet feeder.

12 Claims, 12 Drawing Sheets

AUTOMATIC SHEET FEEDER FOR AN IMAGE FORMING APPARATUS

BACKGROUND OF THE INVENTION

The present invention relates to an automatic sheet feeder for a printer, facsimile apparatus or similar image forming apparatus or a scanner for automatically feeding sheets stacked on a tray to a reading section one by one.

In a conventional sheet feeder for the above application, a sheet feeding mechanism and a pickup roller raising and lowering mechanism are arranged at the center of a sheet of maximum size in the widthwise direction. It is therefore necessary to position two side guides at the same distance from the above center, a rack mechanism for causing the side guides to move in interlocked relation to each other, etc. This makes the various mechanisms sophisticated and thereby increases the cost of the sheet feeder. Further, a feed roller shaft and separation roller frame shaft each are required to have a length corresponding to the distance between the outer edge of a sheet of maximum side and a point around the center of the same sheet in the widthwise direction. Such shafts increase the overall weight of the sheet feeder.

Moreover, the side guides for preventing sheet from skewing must be moved in matching relation to the width of the sheet of maximum size. It follows that when the sheets of different sizes are stacked on the tray together, the sheets of smaller sizes are not regulated in width by the side guides at all. Such sheets not only skew, but also degrade reading quality and jam a conveyance path. Therefore, only the sheets of the same size must be selected and stacked on the tray.

Technologies relating to the present invention are disclose in Japanese Patent Laid-Open Publication Nos. 4-277150, 6-329303, 7-41191, 7-61616 and 9-216772 and Japanese Patent No. 2,636,085.

SUMMARY OF THE INVENTION

It is therefore an object of the present invention to provide a light weight, low cost automatic sheet feeder allowing an image forming apparatus to sequentially read a stack of documents without degrading reading quality or causing paper jams ascribable to skew to occur even when the documents are of different sizes.

An automatic sheet feeder of the present invention includes a tray to be loaded with a stack of sheets, a side guide for preventing the sheets from skewing, and a sheet feeding mechanism for sequentially picking up and feeding the sheets, the top sheet being first. The tray includes an abutment parallel to a direction of sheet conveyance. The stack of sheets abut against the abutment at one side thereof. The side guide is movable toward and away from the abutment in matching relation to the size of the sheets. The sheet feeding mechanism is positioned at the intermediate between the abutment and the position of the side guide matching with sheets of minimum size available with the sheet feeder.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
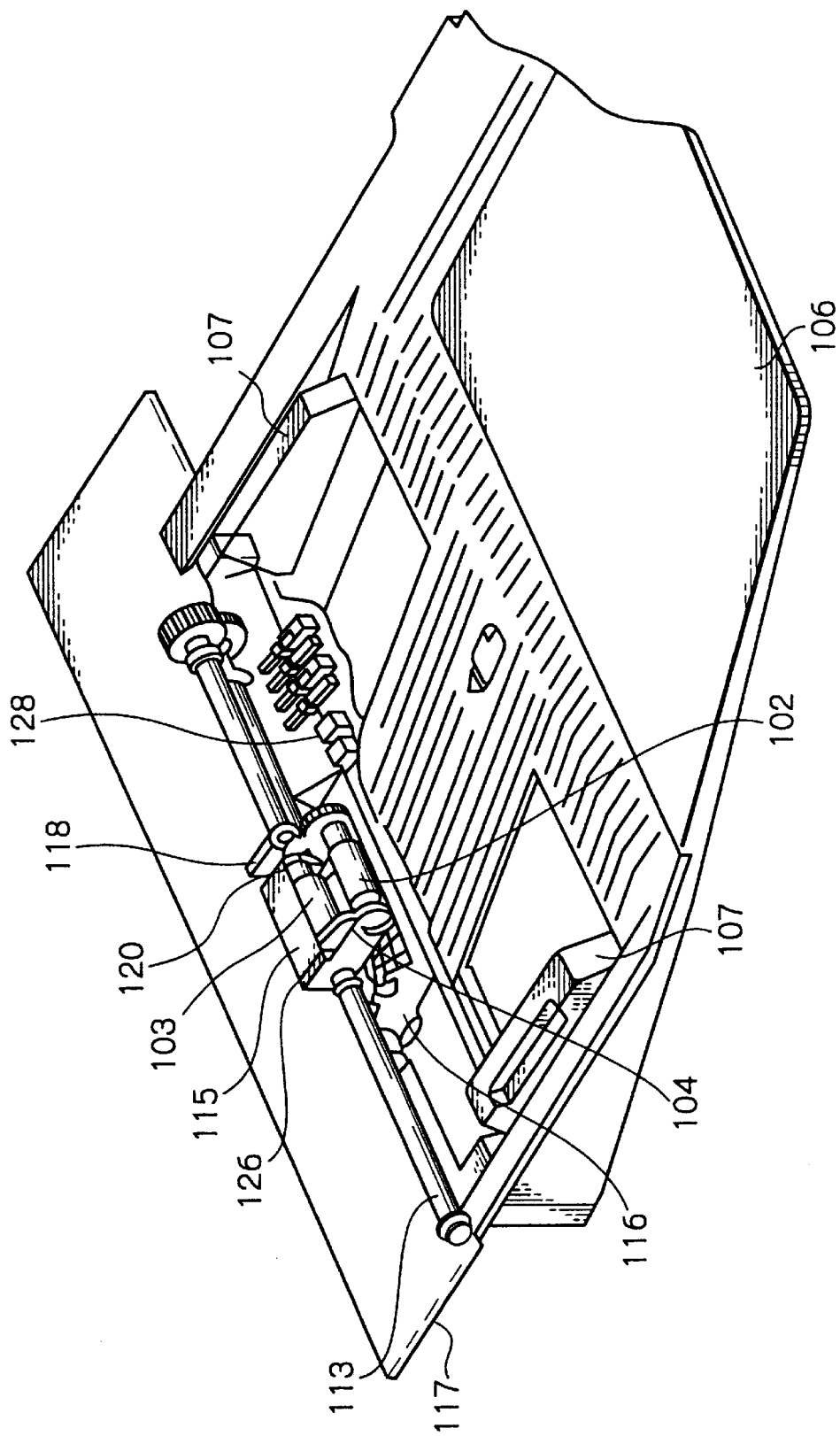
FIG. 1 is a fragmentary isometric view of a conventional automatic sheet feeder.
Figure 2:
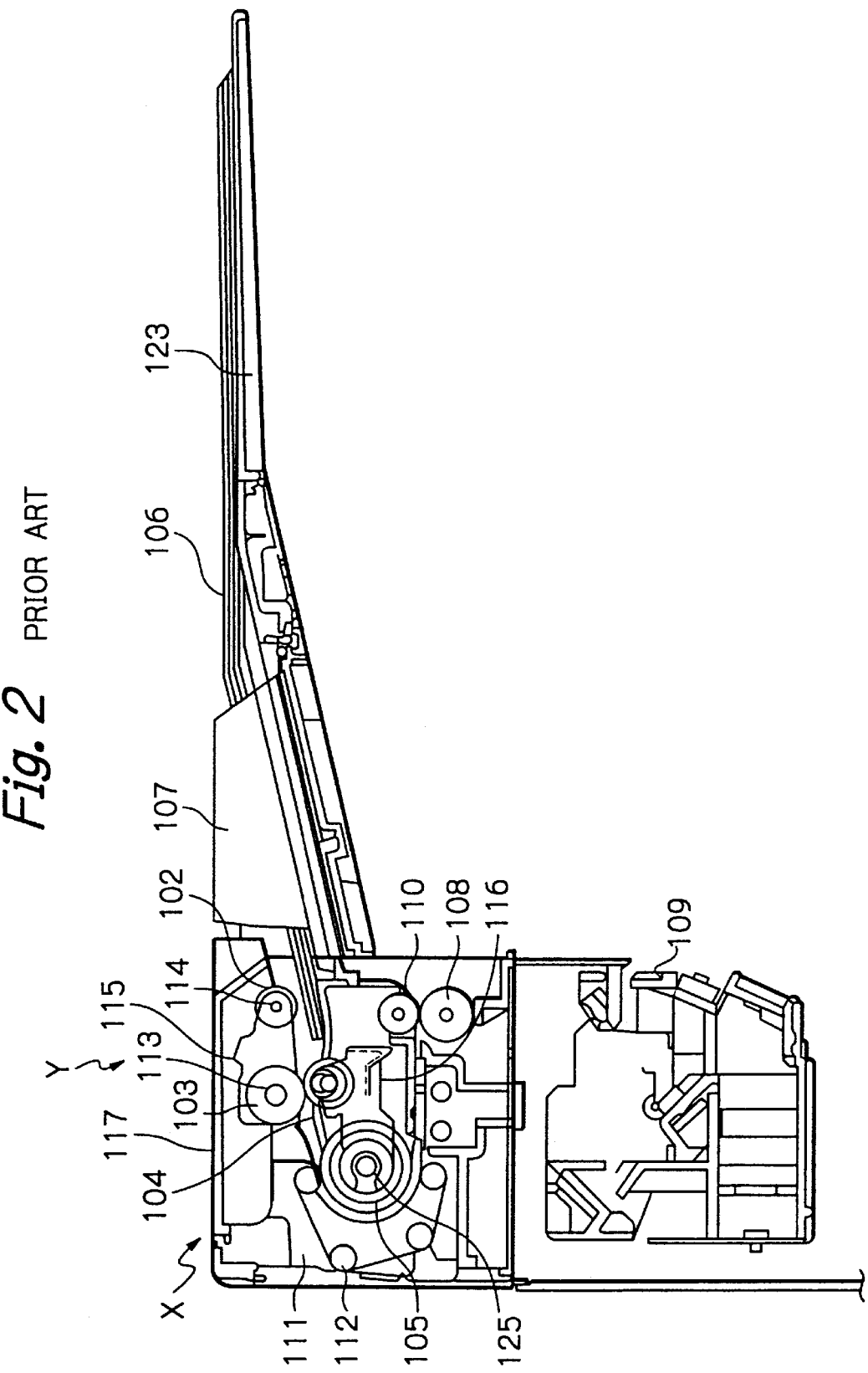
FIG. 2 is a fragmentary sectional front view of the conventional automatic sheet feeder.

To better understand the present invention, reference will be made to a conventional automatic sheet feeder, shown in FIGS. 1–5 and 5A–5C. As shown in FIGS. 1 and 2, the automatic sheet feeder includes a tray 106 on which a plurality of documents or similar sheets 123 are stacked. The tray 106 has its end portion inclined downward. A pair of side guides 107 are positioned at both sides of the tray 106 and movable toward and away from each other. The side guides 107 guide the opposite edges of the sheets 123 in order to prevent the sheets 123 from skewing. The side guides 107 are spaced by the same distance from the center of a width corresponding to the sheets 123 of maximum size applicable to the sheet feeder.

A mount frame 117 is positioned contiguously with the end face of the tray 106 and includes an abutment. A sheet feeding mechanism X, a pickup roller raising and lowering mechanism Y and an optical unit 109 are arranged below the mount frame 117. A sheet sensor 128 is positioned at the boundary between the tray 106 and the mount frame 117.

Figure 4:
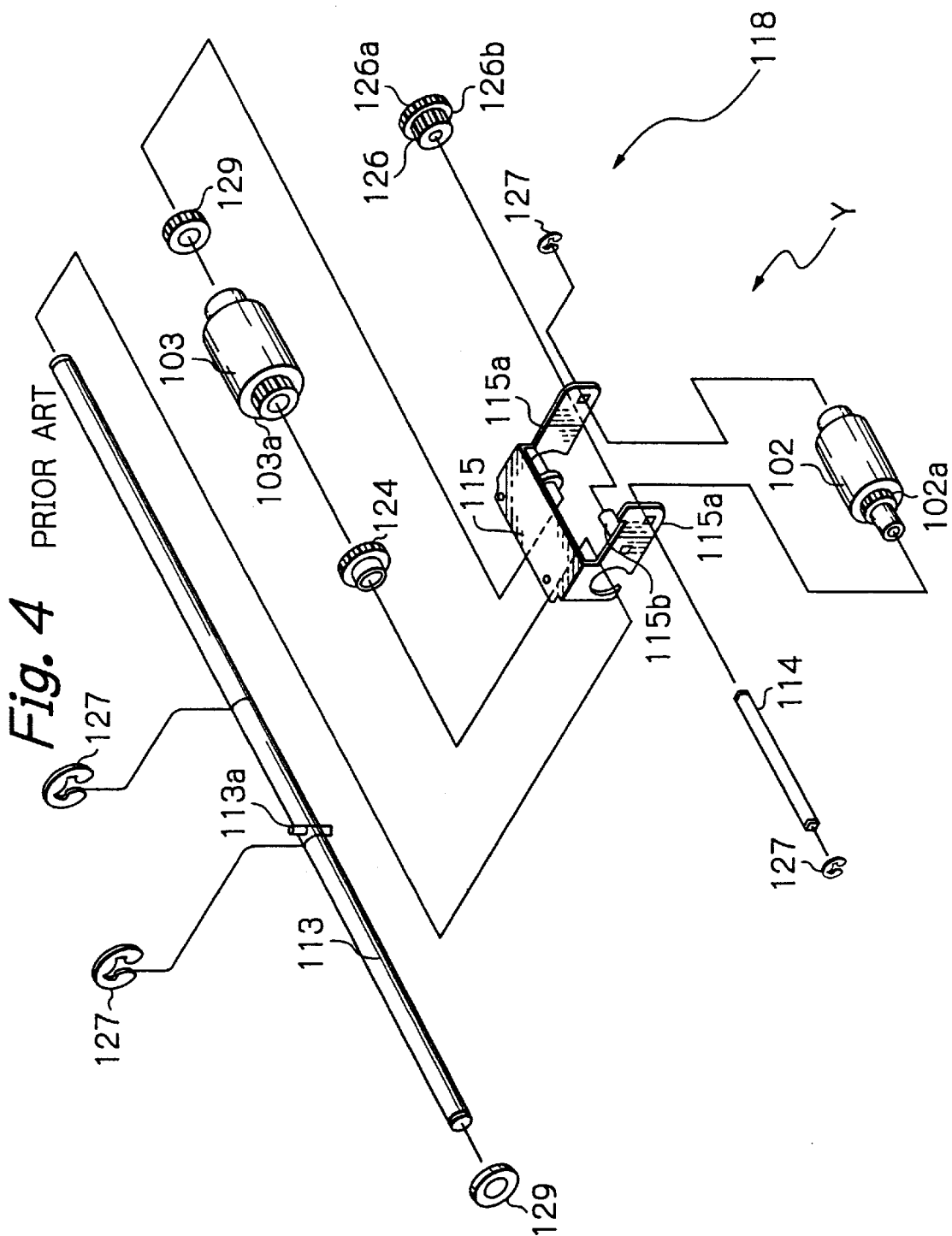
FIG. 4 is an exploded isometric view of a pickup mechanism included in the conventional automatic sheet feeder.

A pickup roller 102 is positioned below the mount frame 117 in the vicinity of the tray 106. The pickup roller 102 pays out the top sheet 123 from the tray 106 toward a feed roller 103 while separating it from the underlying sheets 123. The feed roller 103 is also positioned below the mount frame 117 for conveying the sheet 123 paid out by the pickup roller 102. As shown in FIG. 4, the pickup roller 102 and feed roller 103 respectively have gear portions 102a and 103a on their ends of the same side.

A feed roller shaft 113 is supported by opposite ends of the mount frame 117 via two bushings 129 and passed through a through bore formed in the center of the feed roller 103. A drive motor, not shown, drives the shaft 113 via drive transmitting means not shown. As shown in FIG. 4, a pickup roller frame 115 is mounted on the intermediate portion of the feed roller shaft 113 and sandwiches the feed roller 103. Specifically, the pickup roller frame 115 includes support portions 115 holding the feed roller 113 therebetween. E rings 127 are fitted on the feed roller shaft 113 for positioning the support portions 115a.

Figure 3:
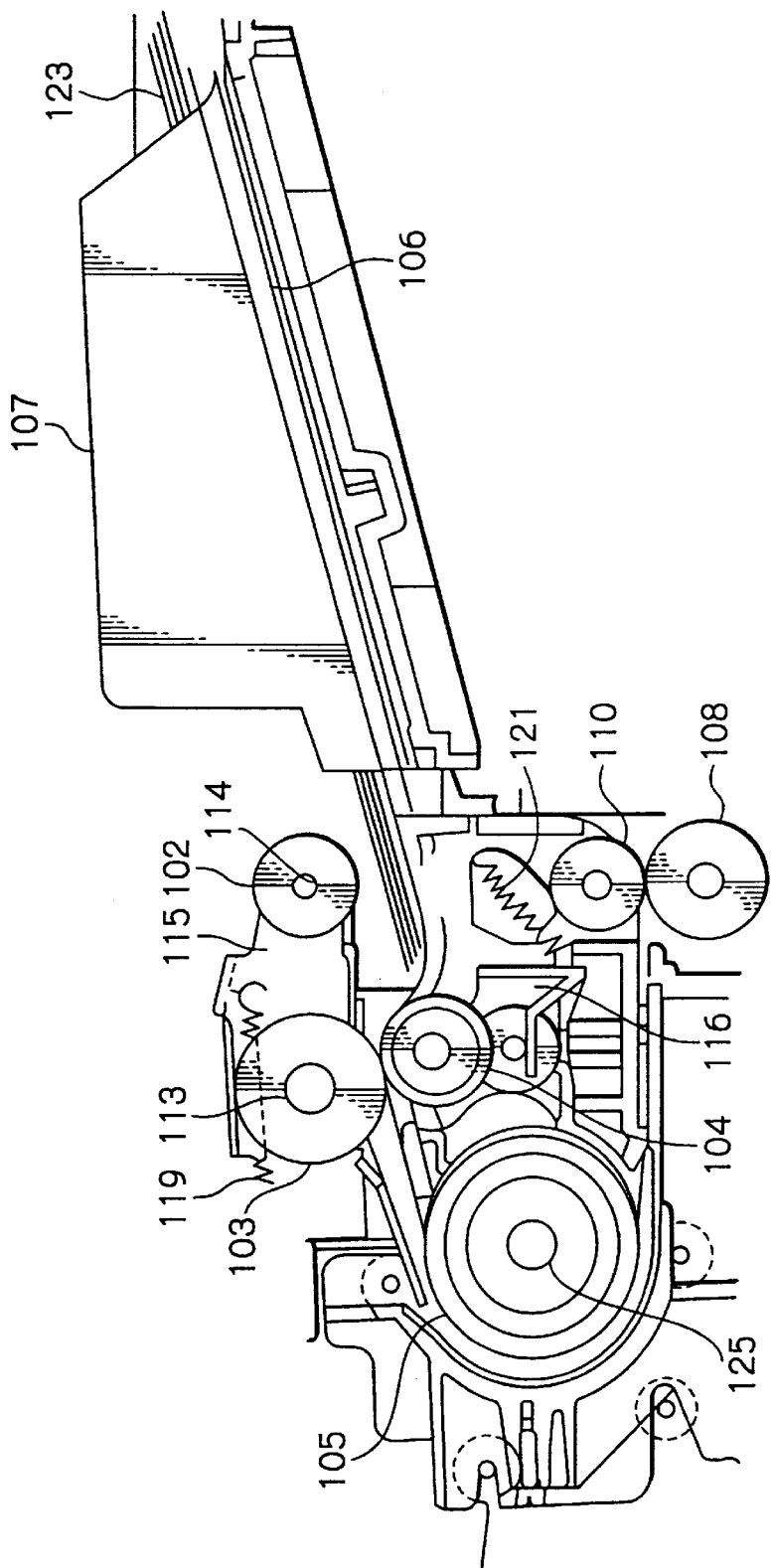
FIG. 3 is a fragmentary enlarged sectional front view of the conventional automatic sheet feeder.

The pickup roller 102 is positioned at the ends of the support portions 115a. Specifically, a pickup roller shaft 114 is passed through a through bore formed in the center of the pickup roller 102. E rings 127 are fitted on the pickup roller shaft 114 for preventing the pickup roller 102 from slipping out. As shown in FIG. 3, the pickup roller 102 is constantly biased upward by a tension coil spring 119 affixed to the pickup roller frame 115.

As shown in FIG. 4, a one-step gear 124 is interposed between one of the support portions 115a and the pickup roller 103. The pickup roller shaft 113 is passed through the gear 124. The pickup roller 124 is greater in diameter than the gear portion 103a of the feed roller 103 and affixed to a pin 113a studded on the feed roller shaft 113. The pickup roller 124 is therefore rotatable integrally with the feed roller shaft 113. A stub 115b protrudes from the support portion 115a adjoining the one-step gear 124. A two-step gear 126 is mounted on the stub 115b.

The two-step gear 126 has coaxial gear portions 126a and 126b having a greater diameter and a smaller diameter, respectively. The gear portion 126a is held in mesh with the gear portion 103a of the feed roller 103 and the gear portion 102a of the pickup roller 102. The other gear portion 126b is held in mesh with the one-step gear 124. The gear portion 103a of the feed roller 103, one-step gear 124, two-step gear 126 and the gear portion 102a of the pickup roller 102 constitute a clutch mechanism 118. Also, the feed roller shaft 113, pickup roller frame 115, one-step gear 124, two-step gear 126, mount frame 117 and sheet sensor 128 constitute the previously mentioned pickup roller raising and lowering mechanism Y.

Assume that the gear portion 103a of the feed roller 103 has Za teeth, that the one-step gear 124 has Zb teeth, and that the larger diameter gear portion 126a and smaller diameter gear portion 126b of the two-step gear 126 have Zc1 teeth and Zc2 teeth, respectively. Then, the gears 103a, 124, 126a and 126b are so configured as to satisfy a relation of (Zc1 Zb/Zc2 Za)>1. Further, assuming that a torque necessary for rotating the feed roller 103 is Tm, then the coil spring 119 lifts the pickup roller 102 with a force selected to be smaller than [(Zc1 Zb/Zc2 Za)−1] Tm.

As shown in FIGS. 2 and 3, a separation roller 104 separates the top sheet 123 from the underlying sheets 123. While the separation roller 104 shares the same motor with the feed roller shaft 113, a torque for causing the roller 104 to rotate in the opposite direction to the feed roller 103 is applied to the roller 104. A torque limiter is built in the separation roller 104 and causes the roller 104 to simply follow the rotation of the feed roller 103 when the paper 123 is absent between the rollers 103 and 104.

As shown in FIG. 1, a clutch mechanism or friction clutch 120 is built in the separation roller 104. As shown in FIGS. 2 and 3, the separation roller 104 is mounted on a separation roller frame 116 and held in contact with the feed roller 103. As shown in FIG. 3, the separation roller frame 116 is supported by a frame shaft 125 and constantly biased by a tension coil spring 121 such that the separation roller 104 resiliently contacts the feed roller 103. The clutch mechanism 120 controls the rotation torque of the separation roller 104. The feed roller 103, separation roller 104, separation roller frame 116, tension coil spring 121, frame shaft 125 and clutch mechanism 120 constitute the sheet feeding mechanism X mentioned earlier.

A reverse roller 105 is also mounted on the frame shaft 125 for reversing the direction in which the sheet 123 is conveyed. By reversing the direction of conveyance, it is possible to reduce the overall size of the sheet feeder. As shown in FIG. 2, a belt 111 is wrapped around the reverse roller 105 over about one half of the circumference of the roller 105. The belt 111 and reverse roller 105 nip the sheet 123 fed by the feed roller 103 and separation roller 104 and reverse the direction of conveyance of the sheet 123.

A roller 108 and a pinch roller 110 are located at one side of the separation roller frame 116 below the pickup roller 102. The roller 108 and pinch roller 110 contact each other for driving the sheet 123 out of the sheet feeder.

Figure 5A:
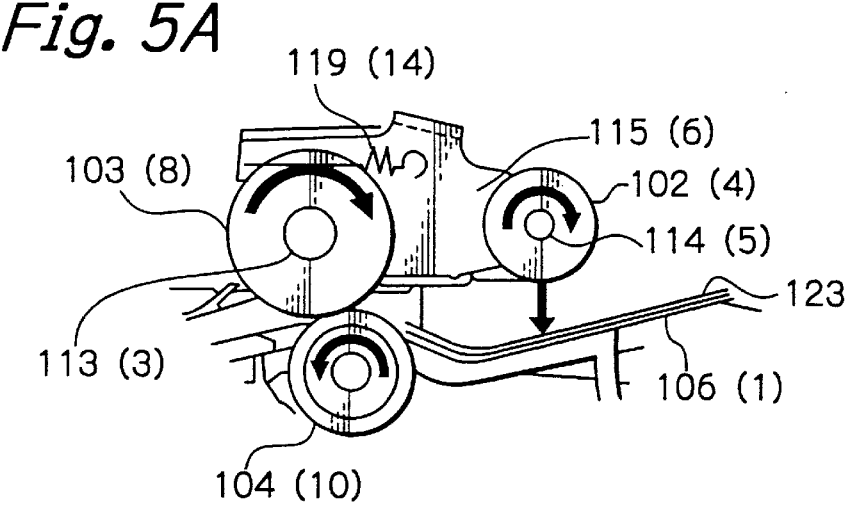
FIGS. 5A–5C are front views demonstrating the operation of the conventional automatic sheet feeder.
Figure 5B:
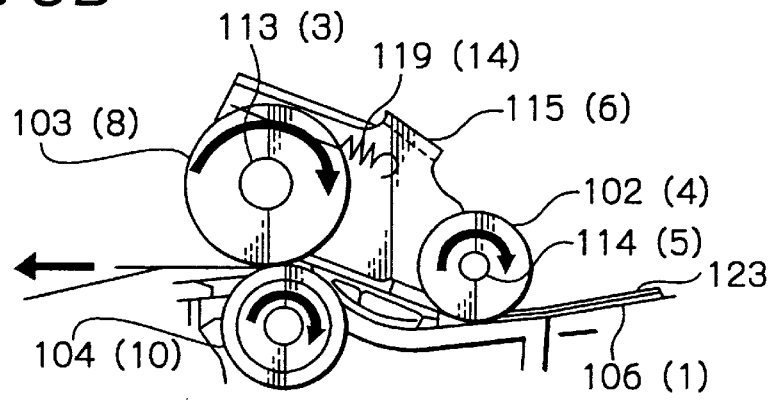
Figure 5C:
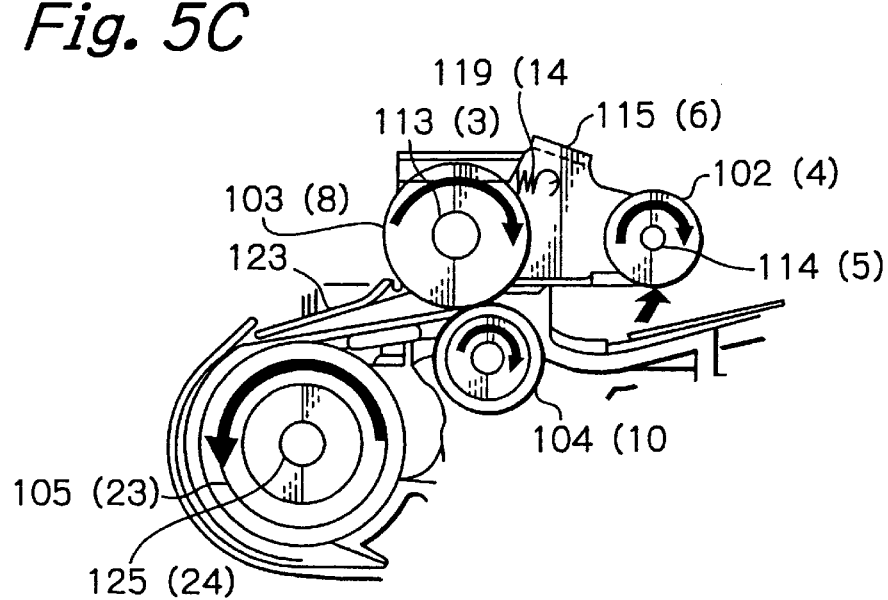

The operation of the above sheet feeder will be described with reference also made to FIGS. 5A–5C. When the drive motor is energized, its rotation is transferred to the feed roller shaft 113 via the drive transmitting means with the result that the one-step gear 124 mounted on the pin 113a rotates. The rotation of the gear 124 is transferred to the smaller diameter gear 26b of the two-step gear 126, causing the gear 126 to rotate in the direction opposite to the direction of sheet conveyance. The rotation of the gear 126 is transferred to the gear portions 103a and 102a of the feed roller 103 and pickup roller 102, respectively. Consequently, the feed roller 103 and pickup roller 102 are rotated in the direction of sheet conveyance, as shown in FIG. 5A.

The feed roller shaft 113 is rotated in the direction of sheet conveyance. Therefore, the clutch mechanism 118 intervening between the feed roller shaft 113 and the pickup roller frame 115 causes the frame 115 to agularly move in the direction of rotation of the feed roller 103 until the pickup roller 102 contacts the top sheet 123 on the tray 106. When the feed roller 103 and separation roller 104 are pressed against each other, the drive force acting on the feed roller shaft 113 causes the feed roller 103 to rotate in the direction of sheet feed against the separation roller 104.

In the above condition, the load torque of (Zc1 Zb/Zc2 Za) Tm acts on the feed roller shaft 113. A difference in torque of [(Zc1 Zb/Zc2 Za)−1] Tm between the feed roller shaft 113 and the feed roller 103 acts on the clutch mechanism 113 about the shaft 113 in the direction of sheet feed. As a result, as shown in FIG. 5B, the pickup roller frame 115 angularly moves in the direction of rotation of the feed roller 103 until the pickup roller 102 reaches the top sheet 123. The pickup roller 102 therefore pays out only the top sheet 123 toward the feed roller 103.

The separation roller 104 returns the sheets 123 other than the top sheet 123 by friction with the result that only the top sheet 123 is conveyed toward the reverse roller 105. When the sheet 123 reaches the reverse roller 105, it is conveyed by the roller 105 at a speed higher than the peripheral speed of the feed roller 103. Consequently, the torque Tm acting on the feed roller shaft 113 and rotating the feed roller 103 disappears, causing the torque rotating the pickup roller frame 115 to also disappear. Therefore, as shown in FIG. 5C, the pickup roller frame 115 is angularly moved away from the sheets 123 on the tray 106 by the force of the tension coil spring 119 smaller than the torque [(Zc1 Zb/Zc2 Za)−1] Tm.

When the trailing edge of the sheet 123 moves away from the feed roller 103, a load again acts on the feed roller 103. This load causes the pickup roller frame 115 to again rotate toward the sheets 123. As a result, the pickup roller 102 pays out the next sheet 123 toward the feed roller 103, as shown in FIG. 5B.

After the trailing edge of the last sheet 123 has moved away from the feed roller 103, the pickup roller frame 115 is again angularly moved such that the pickup roller 103 moves away from the tray 106. After the last sheet 123 has been read and then driven out, the drive motor is rotated in the reverse direction. Then, because the clutch mechanism 20 built in the separation roller 104 is a friction clutch, the drive force for the separation roller 104 is transferred in synchronism with the drive motor, reversing the rotation of the separation roller 104. At this time, the load acting on the feed roller 103 disappears. Consequently, the pickup roller frame 115 is angularly moved away from the tray 106 to its initial position, or home position, under the action of the coil spring 121.

Japanese Patent Laid-Open Publication No. 6-329303 and Japanese Patent No. 2636085 mentioned earlier disclose a sheer conveying device applicable to printing and capable of automatically correcting the skew of a sheet, and a mechanism for correcting the skew of a sheet. Further, Japanese Patent Laid-Open Publication No. 7-41191 teaches an automatic sheet feeder capable of reducing the number of parts and therefore its overall size, easy to adjust, and reliable in operation.

In the above conventional sheet feeder, the sheet feeding mechanism X and pickup roller raising and lowering mechanism Y are arranged at the center of the sheets 123 of maximum size in the direction of width. It is therefore necessary to position two side guides 107 at the same distance from the above center, a rack mechanism to causing the side guides 107 to move in interlocked relation to each other, etc. This makes the various mechanisms sophisticated and thereby increases the cost of the sheet feeder. Further, the feed roller shaft 113 and frame shaft 125 each are required to have a length corresponding to the distance between the outer edge of the sheet 123 of maximum size and a point around the center of the same sheet 123 in the widthwise direction of the sheet 123. Such shafts increase the weight of the sheet feeder.

Moreover, the side guides 107 for preventing the sheet 123 from skewing must be moved in matching relation to the width of the sheet of maximum size. It follows that when the sheets 123 of different sizes are stacked on the tray 106 together, the sheets 123 of smaller sizes are not regulated in width by the side guides 107 at all. Such sheets 123 not only skew, but also degrade reading quality and jam the conveyance path. Therefore, only the sheets 123 of the same size must be selected and stacked on the tray 106.

Referring to FIGS. 6–12B, an automatic sheet feeder embodying the present invention will be described. As shown, the sheet feeder is generally made up of a stacking section A, a feeding mechanism B, a separating section C, a conveying section D, a reversing section E, a reading section F, a discharging section G, and a shutter mechanism H.

Figure 6:
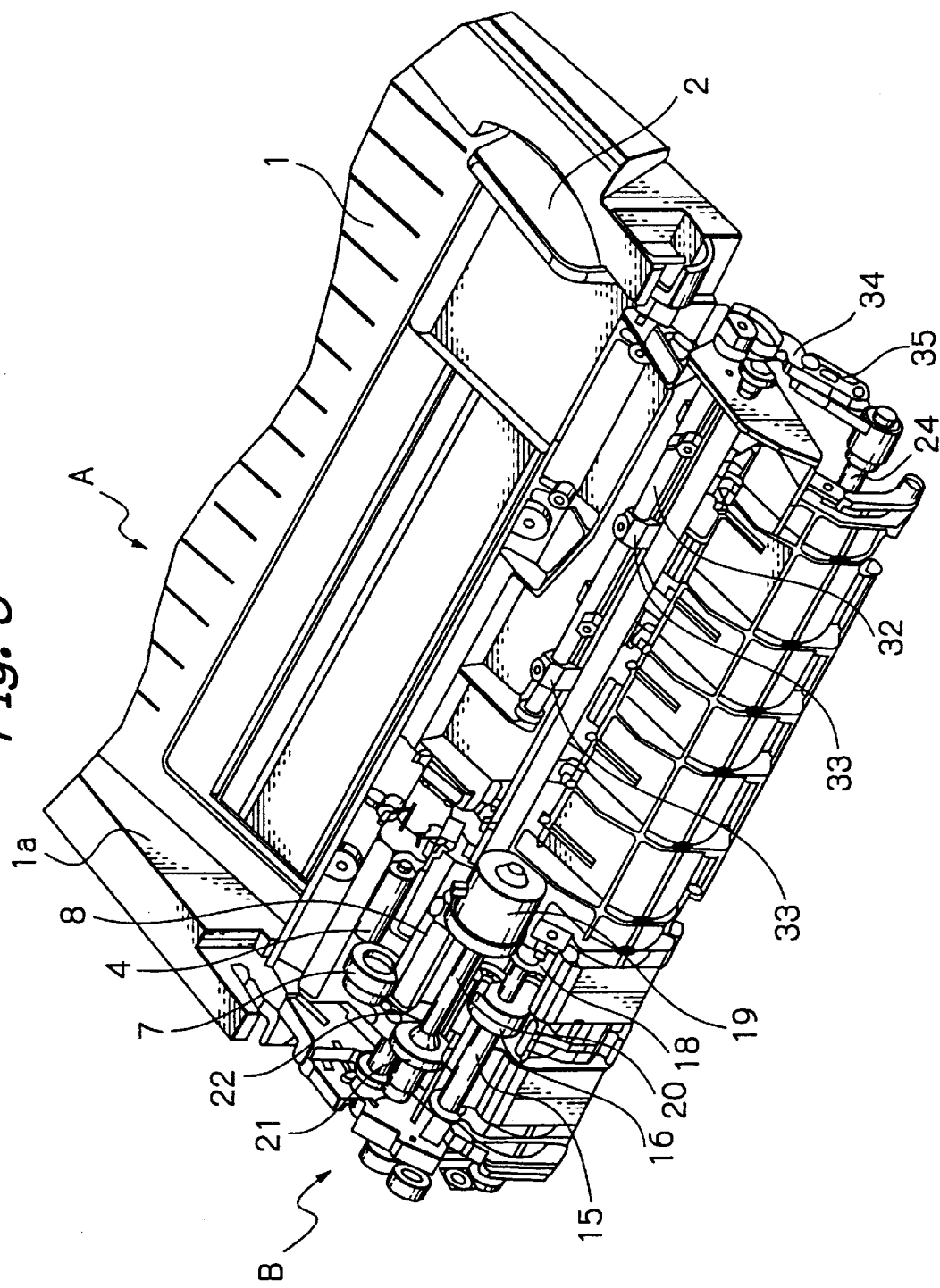
FIG. 6 is a fragmentary isometric view showing an automatic sheet feeder embodying the present invention.

As shown in FIG. 6, the stacking section A includes a tray 1 to be loaded with a stack of sheets, e.g., documents 123. An abutment 1a is positioned at one side edge of the tray 1 while a side guide 2 is positioned at the other side edge of the tray 1 and faces the abutment 1a. The side guide 2 is movable toward and away from the abutment 1a in matching relation to those of the sheets 123 having the greatest size. The side guide 2 holds the sheets 123 between it and the abutment 1a and guides the sheets 123 in order to prevent them from skewing.

Figure 8:
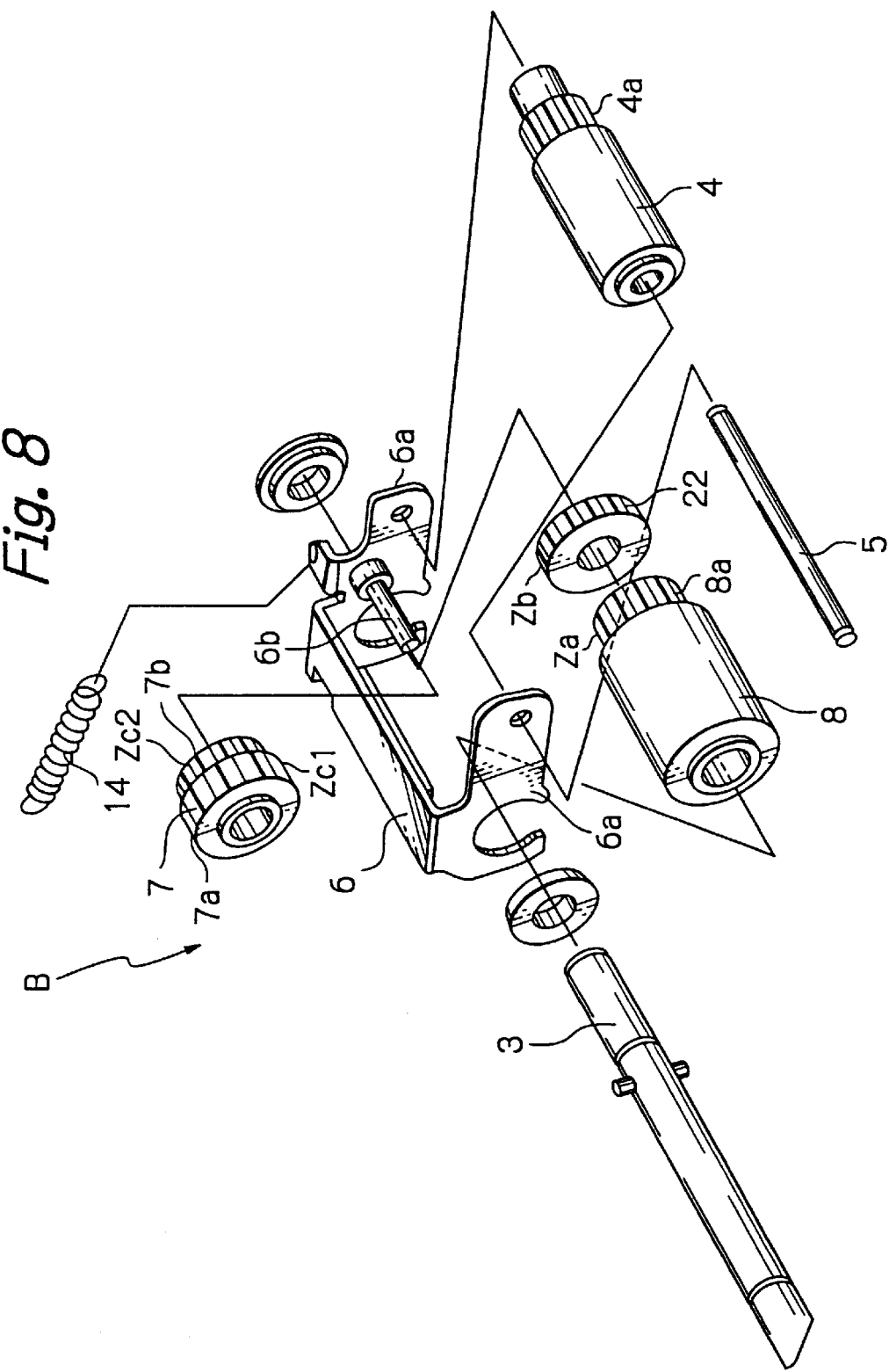
FIG. 8 is an exploded isometric view of a pickup mechanism included in the illustrative embodiment.

As also shown in FIG. 6, the feeding mechanism B is arranged in a casing between the abutment 1a and the side guide 2 held in a position matching with sheets of minimum size applicable to the sheet feeder. As shown in FIG. 8, the feeding mechanism B includes a feed roller shaft 3 shorter than the conventional feed roller shaft 103. A feed roller 8 and a one-step gear 22 are mounted on one end portion of the feed roller shaft 3. The feed roller 8 includes a gear portion 8a smaller in diameter than the one-step gear 22. A pickup roller frame 6 is coupled over the end portion of the feed roller shaft 3 and includes opposite side walls 6a. The feed roller 8 and one-step gear 22 are positioned between the side walls 6a of the frame 6. A pickup roller shaft 5 is passed through a pickup roller 4 which is positioned between the end portions of the side walls 6a. The pickup roller 4 is formed with a gear portion 4a at its one end.

A shaft 6b protrudes from one side wall 6a of the pickup roller frame 6 adjoining the gears 8a, 22 and 4a. A two-step gear 7 is mounted on the shaft 6b for transmitting a drive force to the pickup roller 4. The two-step gear 7 has a larger diameter portion 7a meshing with the gear portion 8a of the feed roller 8 and the gear portion 4a of the pickup roller 4, and a smaller diameter portion 7b meshing with the one-step gear 22. A tension coil spring 14 is anchored to the above side wall 6a for lifting the pickup roller 4 about the feed roller shaft 3. Assume that the gear portion 8a has Za teeth, that the one-step gear 22 has Zb teeth, that the larger diameter gear portion 7a has Zc1 teeth, and that the smaller diameter gear portion 7b has Zc2 teeth.

Figure 7:
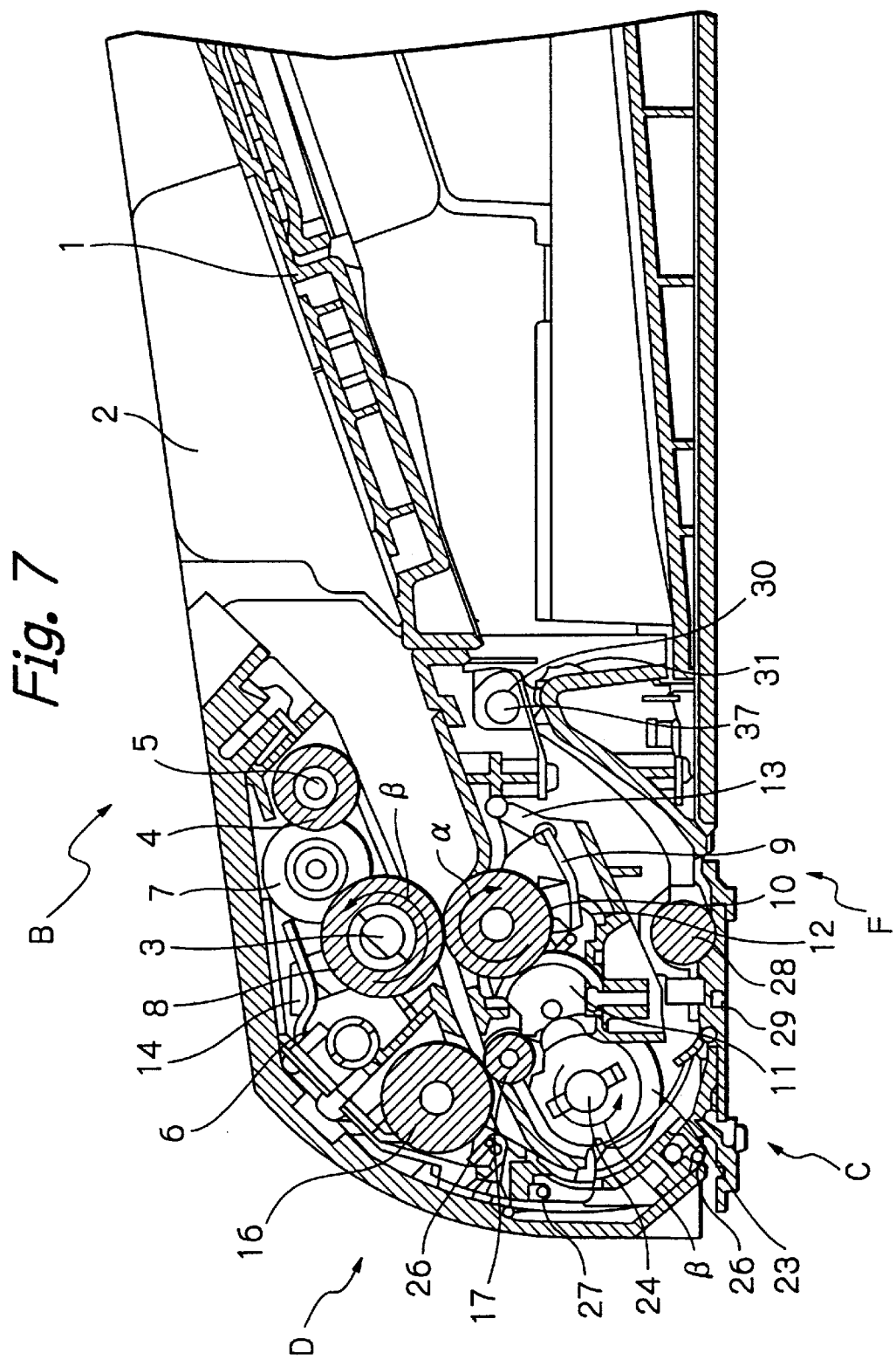
FIG. 7 is a fragmentary sectional front view of the illustrative embodiment.
Figure 9:
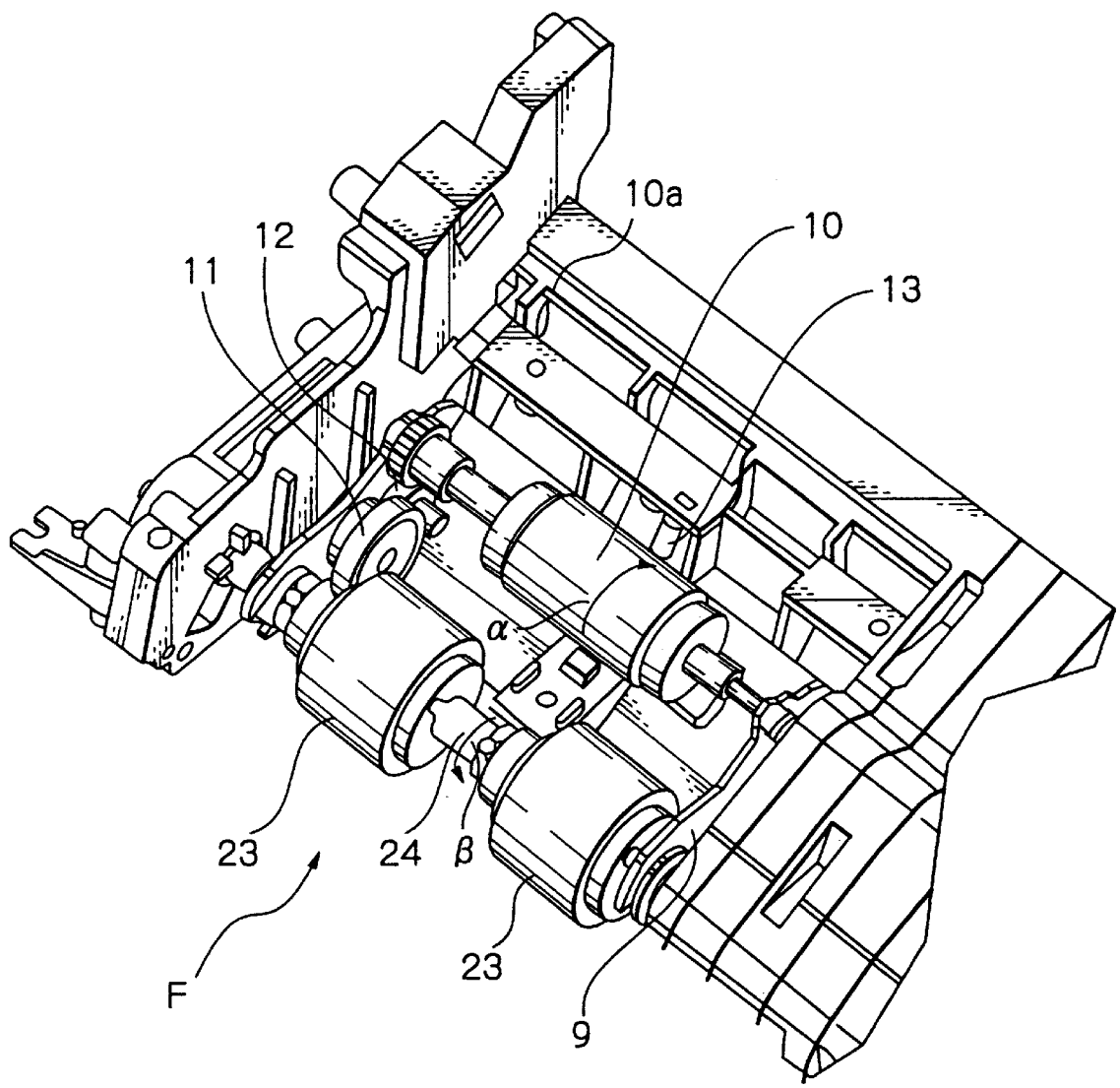
FIG. 9 is an isometric view showing a separation roller also included in the illustrative embodiment.

As shown in FIG. 7, the separating section C includes a separation roller 10 contacting the lower portion of the feed roller 8. As shown in FIG. 9 specifically, a separation roller frame 9 has a generally U-shaped configuration including opposite side walls. The separation roller 10 is positioned between the side walls of the frame 9 and rotated via a gear 10a mounted on a shaft. The gear 10a is held in mesh with a second gear 12 which is, in turn, held in mesh with a first gear 11. A drive motor, not shown, is drivably connected to the first gear 11.

As shown in FIG. 7, the conveying section D includes an auxiliary roller 16 and an auxiliary pinch roller 17. As shown in FIG. 6, the auxiliary roller 16 is mounted on an auxiliary roller shaft 15. As shown in FIG. 7, the auxiliary roller 16 is positioned between the feeding mechanism B and a reverse roller 23 for conveying the sheet 123 fed from the mechanism B toward the reading section F.

A gear 18 is mounted on the auxiliary roller shaft 15 for transmitting a drive force to an electromagnetic clutch 19. A clutch shaft 20 is mounted on the clutch 19 while a gear 21 is mounted on the other side of the clutch shaft 20. The gear 21 transfers a drive force to a gear 22 mounted on the feed roller shaft 3. The auxiliary roller 16 is rotatable at a higher peripheral speed than the feed roller 8.

Figure 10:
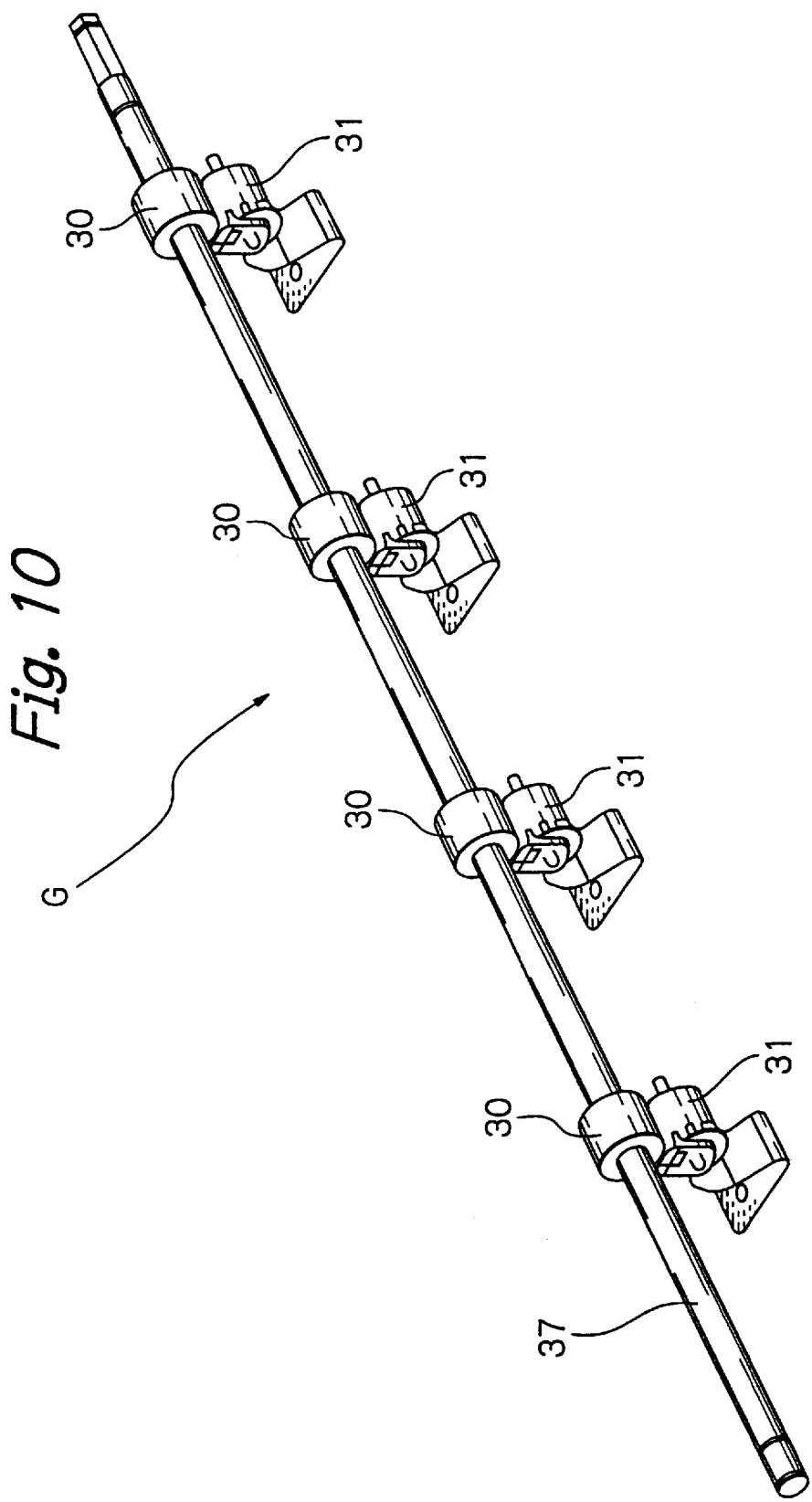
FIG. 10 is a perspective view showing a discharge roller also included in the illustrative embodiment.

As shown in FIGS. 7 and 9, the reversing section E includes a reverse roller 23 mounted on a shaft 24 and a belt 27 passed over the reverse roller 23 over about one half of the circumference of the roller 23. The shaft 24 is mounted on the separation frame 9. The belt 27 is passed over the reverse roller 23 by a plurality of rollers 26. A tension spring 13 is anchored to the separation frame 9. As shown in FIG. 7, the reading section F includes a roller 28 contacting a glass platen 29. As shown in FIGS. 7 and 10, the discharging section G includes a plurality of rollers 30 mounted on a shaft 37. Pinch rollers 31 each are held in contact with one of the rollers 30.

As shown in FIGS. 6, 11, 12A and 12B, the shutter mechanism H includes a shutter 33 mounted on a shaft 32 and constituting a crank. Specifically, the shutter 33 includes a first arm 34 and a second arm 35 mounted on the shafts 32 and 24, respectively. The two arms 34 and 35 are connected to each other in a link fashion to constitute a crank.

The operation of the illustrative embodiment will be described with reference also made to FIGS. 11, 12A, 12B and 5A–5C. How the sheet feeder pays out the sheets 123 while separating the top sheet 123 from the others will be described first. The drive motor causes the auxiliary roller 16 to rotate via transmitting means, not shown, and shaft 15. At the same time, the gear 18 mounted on the shaft 15 is rotated, so that the electromagnetic clutch 19 is coupled. As a result, the rotation of the gear 18 is transferred to the clutch shaft 20 via the clutch 19, causing the gears 21 and 22 to rotate. The gear 22 causes the feed roller shaft 3 to rotate.

The rolation of the above drive motor is also transmitted to the shaft 24 via transmitting means, not shown, causing the shaft 24 to rotate in a direction of sheet conveyance β. Consequently, the gears 11 and 12 are rotated to, in turn, rotate the gear 10a meshing with the gear 12 in a direction α opposite to the direction β. Therefore, the separation roller 10 mounted on the same shaft as the gear 10a rotates in the direction α.

When the feed roller 8 is pressed against the separation roller 10, a drive force transferred to the feed roller shaft 3 in the direction of sheet conveyance β causes the feed roller 8 to rotate in the direction β against the separation roller 10. Assume that the torque causing the feed roller 8 to rotate against the separation roller 10 is Tm. Then, a load torque of (Zc1 Zb/Zc2 Za) Tm acts on the feed roller shaft 3. A difference in torque of [Zc1 Zb/Zc2 Za)−1] between the feed roller shaft 3 and the feed roller 8 acts about the shaft 3. As a result, as shown in FIG. 5A, the pickup roller frame 6 is angularly moved to lower the pickup roller 4.

In the above condition, the drive force is transmitted from the two-step gear 7 of the pickup roller frame 6 to the gear portion 4a of the pickup roller 4, causing the roller 4 to move downward together with the frame 6 while rotating in the direction of sheet conveyance. As shown in FIG. 5B, the pickup roller 4 pays out the sheets 123 from the tray 1 toward the feed roller 8. At this instant, the separation roller 10 frictionally returns the sheets 123 underlying the top sheet 123, so that only the top sheet 123 reaches the auxiliary roller 16.

The auxiliary roller 16 is rotated at a higher peripheral speed than the feed roller 8, as stated earlier. Therefore, the auxiliary roller 16 conveys the sheet 123 at a higher peripheral speed than the feed roller 8. Consequently, the torque Tm causing the feed roller 8 to rotate and therefore the torque lowering the pickup roller frame 6 disappears. As a result, as shown in FIG. 5C, the frame 6 is rotated under the action of the tension coil spring 14 whose bias is smaller than [Zc1 Zb/Zc2 Za)−1] Tm, raising the pickup roller 4.

When the trailing edge of the sheet 123 moves away form the feed roller 8, a load again acts on the feed roller 8 and causes the pickup roller frame 6 to rotate. The pickup roller 4 is therefore again lowered to pay out the sheets 123 from the tray 1 toward the feed roller 8, so that the second sheet 123 is fed in the same manner as the first sheet 123. After the last sheet 123 has moved away form the feed roller 8, the pickup roller frame 6 is again lowered. However, after the last sheet 123 has been read and discharged, the electromagnetic clutch 19 is uncoupled with the result that the pickup roller 4 is lifted to its initial or home position under the action of the tension coil spring 14.

The sheets 123 are prevented from skewing, as follows. The sheets 123 are sequentially fed while abutting against the abutment 1a at one side and against the side guide 2 at the other side. The top sheet 123 is separated from the other sheets 123 by the separating section C and conveyed. The auxiliary roller 16 and auxiliary pinch roller 17 in rotation exert a force on the sheets 123 contacting the abutment 1a toward the side guide 2. This successfully reduces a moment tending to cause the sheets 123 to skew and thereby corrects the skew of the sheets 123.

Figure 11:
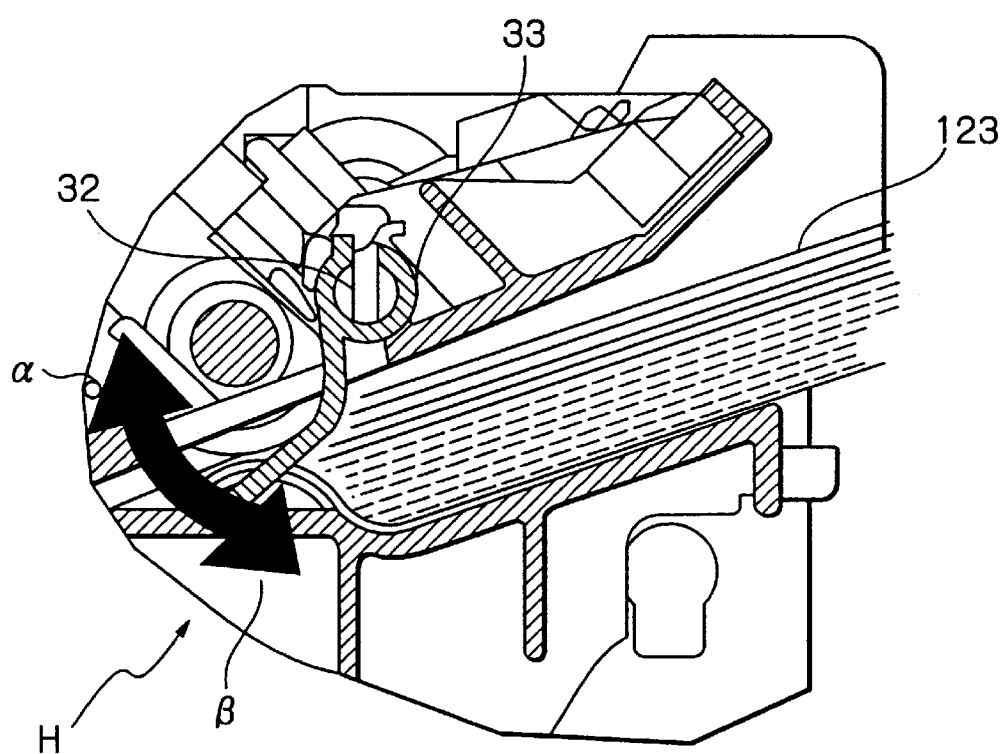
FIG. 11 is a sectional front view showing a shutter mechanism also included in the illustrative embodiment.
Figure 12A:
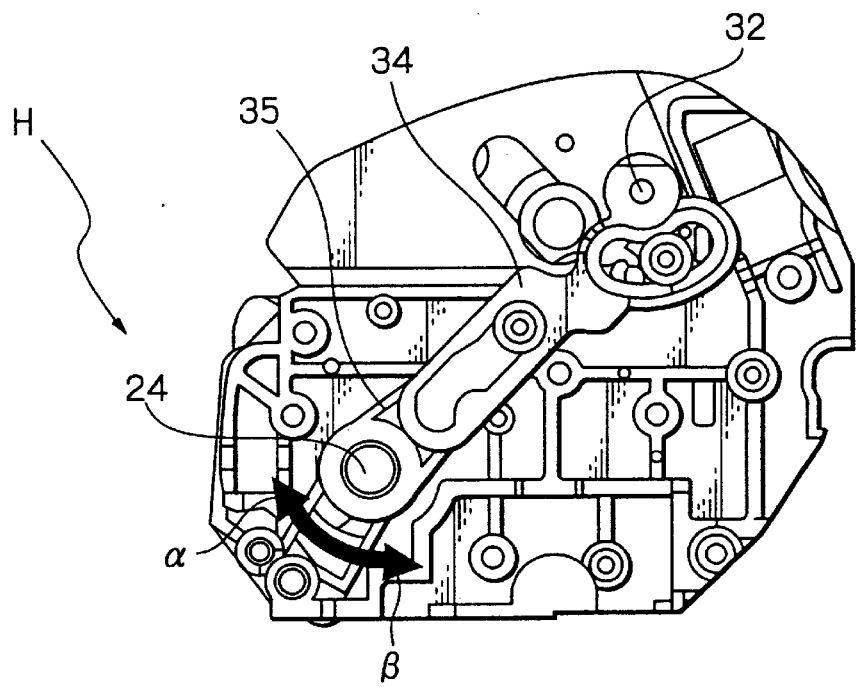
FIGS. 12A and 12B are front views each showing a shutter link mechanism also included in the illustrative embodiment in a particular condition.
Figure 12B:
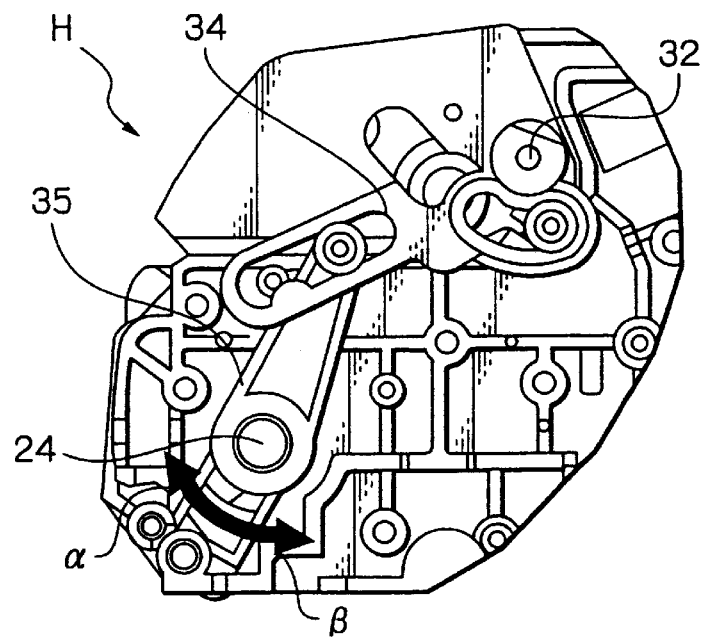

As for the shutter mechanism H, as shown in FIG. 12A, the drive motor causes the roller shaft 24 to rotate in the direction α via transmitting means, not shown. This causes the second arm 35 and thereby the first arm 34 to rotate. At the same time, the shaft 32 is rotated to rotate the shutter 33, as shown in FIG. 11. In this position, the shutter 33 prevents the sheets 123 from skewing when stacked on the tray 1. When the feed roller shaft 24 is rotated in the direction β, the shutter 33 allows the sheets 123 to be paid out.

The sheet 123 reaching the reverse roller 23 is nipped between the roller 23 and the belt 27 and reversed in direction thereby. When the sheet 123 is conveyed by the reverse roller 23 to between the roller 28 and the glass platen 29, an image printed on the sheet 123 is read. The sheet 123 moved away from the roller 28 is conveyed to the rollers 30 being rotated. The rollers 30 and pinch rollers 31 cooperates to discharge the sheet 123. In this manner, even when the sheets 123 stacked on the tray 1 have different sizes, the illustrative embodiment is capable of surely feeding them one by one without any skew.

In summary, it will be seen that the present invention provides a light weight, low cost automatic sheet feeder in which sheet separating and feeding mechanisms including a feed roller and a separation roller are arranged at the center of the maximum sheet width available with the sheet feeder.

An auxiliary roller for conveyance is positioned at the intermediate between an abutment and the position of a side guide matching with the minimum sheet size available with the sheet feeder. In addition, the auxiliary roller has a width sufficiently smaller than the width of a reverse roller. Further, the auxiliary roller is rotatable at a higher peripheral speed than the feed roller. With this configuration, the sheet feeder allows, e.g., a facsimile apparatus, a copier or a scanner to sequentially read a stack of documents without degrading reading quality or causing paper jams to occur even when the documents are different in size.

Various modifications will become possible for those skilled in the art after receiving the teachings of the present disclosure without departing from the scope thereof.

What is claimed is:

1. An automatic sheet feeder comprising:
   a tray adapted to be loaded with a stack of sheets having the same or different sizes from each other;
   a side guide which prevents the sheets of the same size from skewing;
   a sheet feeding mechanism which sequentially picks up and feeds the sheets, a top sheet being first; and
   a shutter mechanism positioned at a sheet inlet opposite to said sheet feeding mechanism which prevents the sheets from skewing when the sizes of said sheets are different from each other;
   said tray including an abutment parallel to a direction of sheet conveyance, the stack of sheets abutting against said abutment at one side thereof;
   said side guide being movable toward and away from said abutment in matching relation to a size of the sheets;
   said sheet feeding mechanism being positioned at an intermediate between said abutment and a position of said side guide matching with sheets of minimum size available with said sheet feeder.

2. An automatic sheet feeder as claimed in claim 1, wherein said sheet feeding mechanism includes an electromagnetic clutch in a driveline thereof.

3. An automatic sheet feeder as claimed in claim 2, further comprising:

a reverse roller which conveys the sheet fed from said sheet feeding mechanism toward a sheet reading section; and an auxiliary roller positioned between said sheet feeding mechanism and said reverse roller, said auxiliary roller being located at the intermediate between said abutment and the position of said side guide matching with the sheets of minimum size, and having a sufficiently smaller width than said reverse roller.

4. An automatic sheet feeder as claimed in claim 3, wherein said auxiliary roller is rotable at a higher peripheral speed than a feed roller included in said sheet feeding mechanism.

5. An automatic sheet feeder as claimed in claim 2, wherein said shutter mechanism comprises a first arm and a second arm respectively mounted on a shaft on which a shutter is mounted and a shaft on which a reverse roller is mounted, said first arm and said second arm constituting a crank.

6. An automatic sheet feeder as claimed in claim 1, further comprising:

a reverse roller which conveys the sheet fed from said sheet feeding mechanism toward a sheet reading section; and an auxiliary roller positioned between said sheet feeding mechanism and said reverse roller, said auxiliary roller being located at the intermediate between said abutment and the position of said guide matching with the sheets of minimum size, and having a sufficiently smaller width than said reverse roller.

7. An automatic sheet feeder as claimed in claim 6, wherein said auxiliary roller is rotatable at a higher peripheral speed than a feed roller included in said sheet feeding mechanism.

8. An automatic sheet feeder as claimed in claim 1, wherein said shutter mechanism comprises a first arm and a second arm respectively mounted on a shaft on which a shutter is mounted and a shaft on which a reverse roller is mounted, said first arm and said second arm constituting a crank.

9. An automatic sheet feeder comprising:

a tray to be loaded with a stack of sheets, said tray including an abutment parallel to a direction of sheet conveyance, the stack of sheets abutting against said abutment at one side thereof;

a side guide which prevents the sheets from skewing, said side guide being movable toward and away from said abutment in matching relation to a size of the sheets;

a sheet feeding mechanism which sequentially picks up and feeds the sheets, a top sheet being first, said sheet feeding mechanism including an electromagnetic clutch in a driveline thereof, said sheet feeding mechanism being positioned at an intermediate between said abutment and a position of said side guide matching with sheets of minimum size available with said sheet feeder;

a reverse roller which conveys the sheet fed from said sheet feeding mechanism toward a sheet reading section; and an auxiliary roller positioned between said sheet feeding mechanism and said reverse roller, said auxiliary roller being located at the intermediate between said abutment and the position of said side guide matching with the sheets of minimum size, and having a sufficiently smaller width than said reverse roller, said auxiliary roller being rotatable at a higher peripheral speed than a feed roller included in said sheet feeding mechanism; and a shutter mechanism positioned at a sheet inlet opposite to said sheet feeding mechanism which prevents the sheets from skewing when sizes of said sheets are different from each other, wherein said shutter mechanism comprises a first arm and a second arm respectively mounted on a shaft on which a shutter is mounted and a shaft on which said reverse roller is mounted, said first arm and said second arm constituting a crank.

10. An automatic sheet feeder comprising:

a tray to be loaded with a stack of sheets, said tray including an abutment parallel to a direction of sheet conveyance, the stack of sheets abutting against said abutment at one side thereof;

a side guide which prevents the sheets from skewing, said side guide being movable toward and away from said abutment in matching relation to a size of the sheets;

a sheet feeding mechanism which sequentially picks up and feeds the sheets, a top sheet being first, said sheet feeding mechanism includes an electromagnetic clutch in a driveline thereof, said sheet feeding mechanism being positioned at an intermediate between said abutment and a position of said side guide matching with sheets of minimum size available with said sheet feeder;

a reverse roller which conveys the sheet fed from said sheet feeding mechanism toward a sheet reading section;

an auxiliary roller positioned between said sheet feeding mechanism and said reverse roller, said auxiliary roller being located at the intermediate between said abutment and the position of said side guide matching with the sheets of minimum size, and having a sufficiently smaller width than said reverse roller; and a shutter mechanism positioned at a sheet inlet opposite to said sheet feeding mechanism which prevents the sheets from skewing when sizes of said sheets are different from each other, wherein said shutter mechanism comprises a first arm and a second arm respectively mounted on a shaft on which a shutter is mounted and a shaft on which said reverse roller is mounted, said first arm and said second arm constituting a crank.

11. An automatic sheet feeder comprising:

a tray to be loaded with a stack of sheets, said tray including an abutment parallel to a direction of sheet conveyance, the stack of sheets abutting against said abutment at one side thereof;

a side guide which prevents the sheets from skewing, said side guide being movable toward and away from said abutment in matching relation to a size of the sheets;

a sheet feeding mechanism which sequentially picks up and feeds the sheets, a top sheet being first, said sheet feeding mechanism being positioned at an intermediate between said abutment and a position of said side guide matching with sheets of minimum size available with said sheet feeder;

a reverse roller which conveys the sheet fed from said sheet feeding mechanism toward a sheet reading section;

an auxiliary roller positioned between said sheet feeding mechanism and said reverse roller, said auxiliary roller being located at the intermediate between said abutment and the position of said side guide matching with the sheets of minimum size, and having a sufficiently smaller width than said reverse roller, said auxiliary roller being rotatable at a higher peripheral speed than a feed roller included in said sheet feeding mechanism; and a shutter mechanism positioned at a sheet inlet opposite to said sheet feeding mechanism which prevents the sheets from skewing when sizes of said sheets are different from each other, wherein said shutter mechanism comprises a first arm and a second arm respectively mounted on a shaft on which a shutter is mounted and a shaft on which said reverse roller is mounted, said first arm and second arm constituting a crank.

12. An automatic sheet feeder comprising:

a tray to be loaded with a stack of sheets, said tray including an abutment parallel to a direction of sheet conveyance, the stack of sheets abutting against said abutment at one side thereof;

a side guide which prevents the sheets from skewing, said side guide being movable toward and away from said abutment in matching relation to a size of the sheets;

a sheet feeding mechanism which sequentially picks up and feeds the sheets, a top sheet being first, said sheet feeding mechanism being positioned at an intermediate between said abutment and a position of said side guide matching with sheets of minimum size available with said sheet feeder;

a reverse roller which conveys the sheet fed from said sheet feeding mechanism toward a sheet reading section;

an auxiliary roller positioned between said sheet feeding mechanism and said reverse roller, said auxiliary roller being located at the intermediate between said abutment and the position of said side guide matching with the sheets of minimum size, and having a sufficiently smaller width than said reverse roller; and a shutter mechanism positioned at a sheet inlet opposite to said sheet feeding mechanism which prevents the sheets from skewing when sizes of said sheets are different from each other, wherein said shutter mechanism comprises a first arm and a second arm respectively mounted on a shaft on which a shutter is mounted and a shaft on which said reverse roller is mounted, said first arm and said second arm constituting a crank.

* * * * *